United States Patent
Smith

(10) Patent No.: US 12,459,326 B2
(45) Date of Patent: Nov. 4, 2025

(54) ADJUSTABLE SHOCK ADAPTER

(71) Applicant: Shock Therapy Suspension, Inc., Duluth, GA (US)

(72) Inventor: Justin Smith, Wittmann, AZ (US)

(73) Assignee: Shock Therapy Suspension, Inc., Duluth, GA (US)

( * ) Notice: Subject to any disclaimer, the term of this patent is extended or adjusted under 35 U.S.C. 154(b) by 0 days.

(21) Appl. No.: 18/647,884

(22) Filed: Apr. 26, 2024

(65) Prior Publication Data
US 2024/0359522 A1 Oct. 31, 2024

Related U.S. Application Data

(60) Provisional application No. 63/498,734, filed on Apr. 27, 2023.

(51) Int. Cl.
*B60G 17/02* (2006.01)

(52) U.S. Cl.
CPC ........ *B60G 17/021* (2013.01); *B60G 2202/12* (2013.01); *B60G 2202/441* (2013.01); *B60G 2204/61* (2013.01); *B60G 2500/30* (2013.01)

(58) Field of Classification Search
CPC .............. B60G 17/021; B60G 2202/12; B60G 2202/441; B60G 2204/61; B60G 2500/30; B60G 15/063; F16F 1/121
See application file for complete search history.

(56) References Cited

U.S. PATENT DOCUMENTS

| | | | | |
|---|---|---|---|---|
| 3,877,687 A | * | 4/1975 | Sarti | B60G 17/021 267/195 |
| 4,474,363 A | * | 10/1984 | Numazawa | B60G 15/063 280/124.147 |
| 4,736,931 A | * | 4/1988 | Christopherson | F16F 13/00 188/322.19 |
| 4,830,395 A | * | 5/1989 | Foley | B60G 17/0272 280/124.162 |
| 5,022,501 A | * | 6/1991 | Hayashi | B60G 17/0272 188/300 |
| 5,044,614 A | * | 9/1991 | Rau | B60G 17/021 267/221 |
| 6,293,533 B1 | * | 9/2001 | Sasse | F16F 1/12 267/221 |

(Continued)

*Primary Examiner* — Paul N Dickson
(74) *Attorney, Agent, or Firm* — Schmeiser, Olsen & Watts LLP

(57) ABSTRACT

An adjustable shock adapter for converting a non-adjustable shock into a shock with full spring and ride height adjustment. The adjustable shock adapter may include a tubular component adapted for engagement with a shaft of the non-adjustable shock. The tubular component may include a rim extending radially outward from an outer surface of the tubular component, located towards the bottom of the tubular component, and positioned against a fixed component of the shock absorber to prevent the tubular component from sliding past the component. The adjustable shock adapter may also include a collar mounted to the outer surface of the tube-shaped component and moveable upwards or downwards along the tubular component and locked into place. The collar may include a second rim positioned against a spring of the non-adjustable shock, acting as a stopper to limit how low the height of the UTV can be adjusted.

12 Claims, 4 Drawing Sheets

(56) References Cited

U.S. PATENT DOCUMENTS

| | | | | |
|---|---|---|---|---|
| 8,602,429 B2* | 12/2013 | Nguyen | ............ | B60G 17/0272 |
| | | | | 280/124.162 |
| 11,679,638 B2* | 6/2023 | Nadeau | ................ | F16F 13/007 |
| | | | | 280/6.157 |
| 12,077,028 B2* | 9/2024 | Smith | .................. | B60G 15/065 |
| 12,330,466 B2* | 6/2025 | Priess | .................... | B60G 11/16 |
| 2002/0038929 A1* | 4/2002 | Now | .................... | B60G 17/021 |
| | | | | 267/217 |
| 2002/0171223 A1* | 11/2002 | Chan | ...................... | F16F 1/041 |
| | | | | 280/124.179 |
| 2015/0308536 A1* | 10/2015 | Smith | .................... | F16F 1/121 |
| | | | | 411/432 |
| 2022/0001714 A1* | 1/2022 | Blankson | ............ | B60G 17/021 |
| 2024/0131890 A1* | 4/2024 | Blankson | ........... | B60G 21/0551 |
| 2025/0236151 A1* | 7/2025 | Lefebvre | ................ | F16F 1/121 |

\* cited by examiner

ADJUSTABLE SHOCK ADAPTER

CROSS REFERENCE TO RELATED APPLICATION(S)

This application claims priority to U.S. Provisional Patent Application entitled "ADJUSTABLE SHOCK ADAPTER," Ser. No. 63/498,734, filed Apr. 27, 2023, the disclosure of which is hereby incorporated entirely herein by reference.

BACKGROUND OF THE TECHNOLOGY

Technical Field

The technical field relates to adjustable shock adapters for converting non-adjustable shocks with little or no spring adjustment into shocks with full spring and ride height adjustment.

State of the Art

Shock absorbers play a critical role in ensuring the safety and comfort of riders in various vehicles, including UTVs. Adjustable shocks are preferred by many riders because they allow for fine-tuning of the suspension system to accommodate different terrains and riding conditions.

In the current state of the art, however, many UTVs are equipped with non-adjustable shocks, which lack the flexibility and adaptability of adjustable shocks. This is often due to cost constraints and limitations in manufacturing capabilities. The non-adjustable shocks are typically factory-welded to the UTV and have little or no spring adjustment, limiting the ability of the user to adjust the ride height and the stiffness of the shock.

There are some existing solutions in the market that aim to convert non-adjustable shocks into adjustable ones. However, these solutions have their limitations. Some require complete replacement of the non-adjustable shocks with adjustable ones, which can be expensive and time-consuming. Others involve the use of complex and bulky adapters that can interfere with the functioning of the suspension system or compromise the safety of the UTV.

Accordingly, there is a need for an adjustable shock adapter that provides a simple, effective, and cost-effective solution for upgrading a non-adjustable shock on a UTV to an adjustable one, that provides such a solution by offering a unique design that can be easily mounted onto a non-adjustable shock, without requiring any major modification to the UTV or the shock, and that allows for full spring and ride height adjustment by the user while limiting the minimum height adjustment to ensure safe operation of the UTV.

SUMMARY OF THE TECHNOLOGY

The present technology relates to an adjustable shock adapter for converting a non-adjustable shock with little or no spring adjustment into a shock with full spring and ride height adjustment.

An embodiment includes an adjustable shock adapter that may comprise a tubular component adapted for engagement with a shaft of the non-adjustable shock, wherein the tubular component may slide onto the shaft. The tubular component may comprise threads formed around a circular outer edge of the tube-shaped component, and a first rim extending radially outward from an outer surface of the tubular component, located towards the bottom of the tubular component, and positioned against a fixed component of the shock absorber, effectively creating a barrier that prevents the tubular component from sliding past the component to ensure that the height adjustment of the UTV is maintained, even when subjected to the forces of the spring. The adjustable shock adapter may also comprise a collar mounted to the outer surface of the tube-shaped component, comprising threads formed on an inner surface thereof that are mateably engageable with the threads formed on the tube-shaped body, such that the collar can be moved upwards or downwards along the tubular component and locked into place by twisting the collar to either move it upwards or downwards. The collar may comprise a second rim extending radially outward from the collar, positioned against a spring of the non-adjustable shock when the invention is fitted to the non-adjustable shock, acting as a stopper to limit how low the height of the UTV can be adjusted.

Another embodiment may include a method for adjusting the height of a UTV equipped with a non-adjustable shock absorber, the method comprising: providing an adjustable shock adapter comprising a tubular component and a collar; sliding the tubular component of the adjustable shock adapter onto a shaft of the non-adjustable shock absorber; fitting the collar onto the tubular component either upwards or downwards; pressing the collar against a spring of the non-adjustable shock absorber to secure the adjustable shock adapter in place; adjusting the height of the UTV by moving the collar up or down, thereby compressing or releasing the spring of the non-adjustable shock absorber, respectively; and ensuring that the height adjustment of the UTV remains above a minimum height for safe operation.

The foregoing and other features and advantages of the present technology will be apparent from the following more detailed description of the particular embodiments of the technology, as illustrated in the accompanying drawings.

BRIEF DESCRIPTION OF THE DRAWINGS

A more complete understanding of the present technology may be derived by referring to the detailed description when considered in connection with the Figures, and.

DETAILED DESCRIPTION OF EMBODIMENTS

As discussed above, embodiments of the present invention relate to an adjustable shock adapter that is attachable to a non-adjustable shock on a UTV or other vehicle to enable the non-adjustable shock to be upgraded or converted into a shock with full spring and ride height adjustment capabilities, while limiting the minimum height adjustment to ensure safe operation of the UTV.

Figure 1:
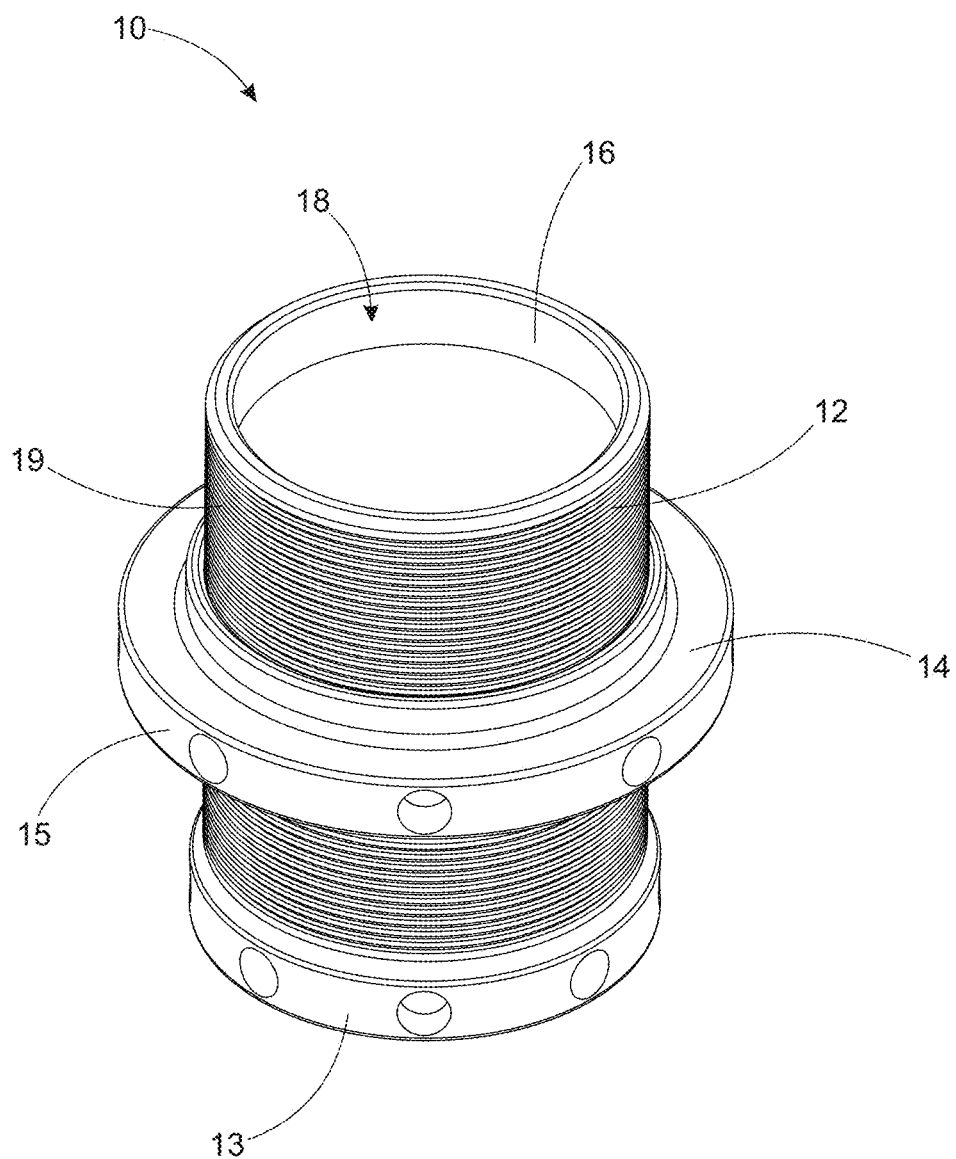
FIG. 1 is a perspective view of an adjustable shock adapter in accordance with an embodiment of the present technology.
Figure 2:
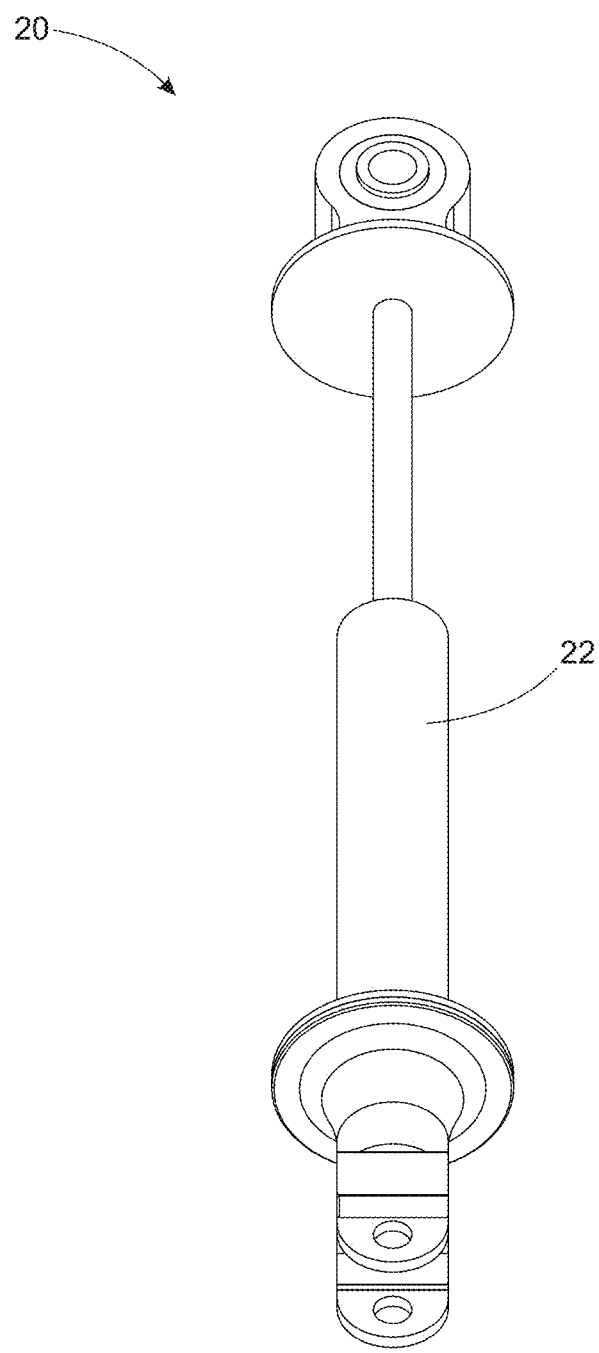
FIG. 2 is a front view of a shaft of a non-adjustable shock without an adjustable shock adapter installed thereto.
Figure 3:
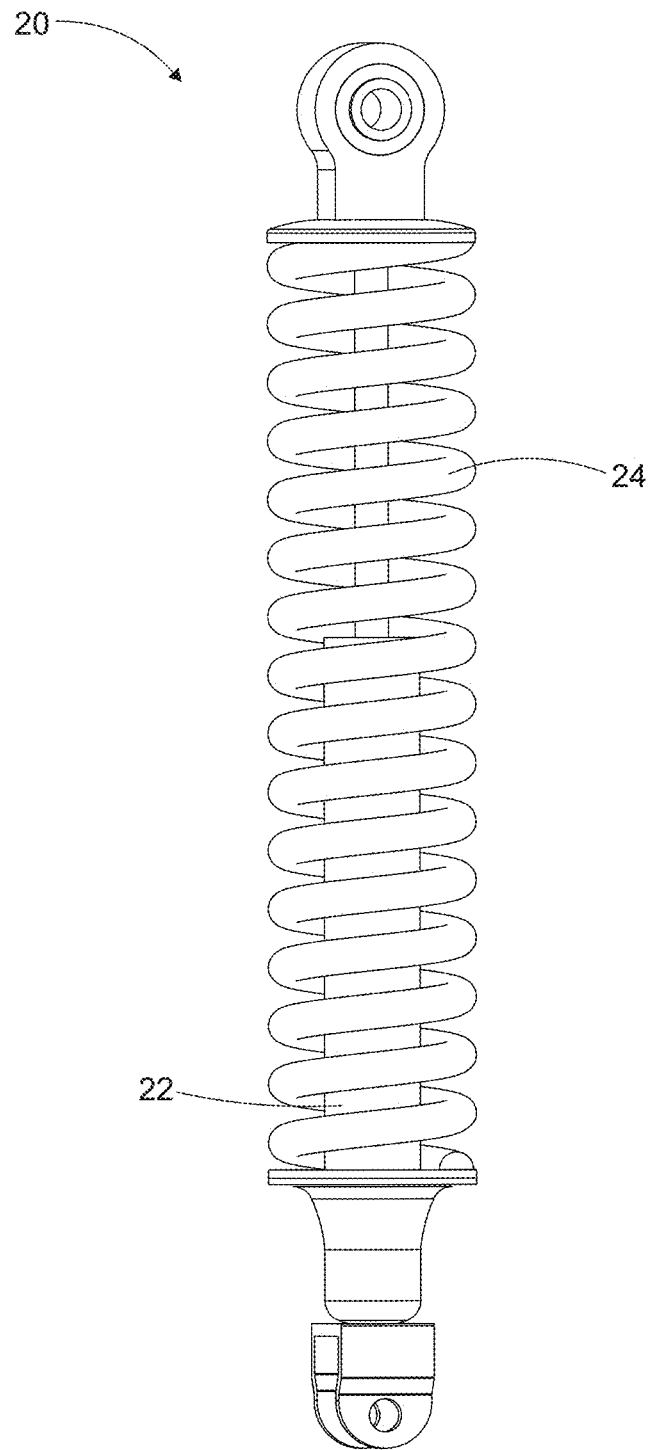
FIG. 3 is a front view of a shaft and a spring of a non-adjustable shock without an adjustable shock adapter installed thereto.
Figure 4:
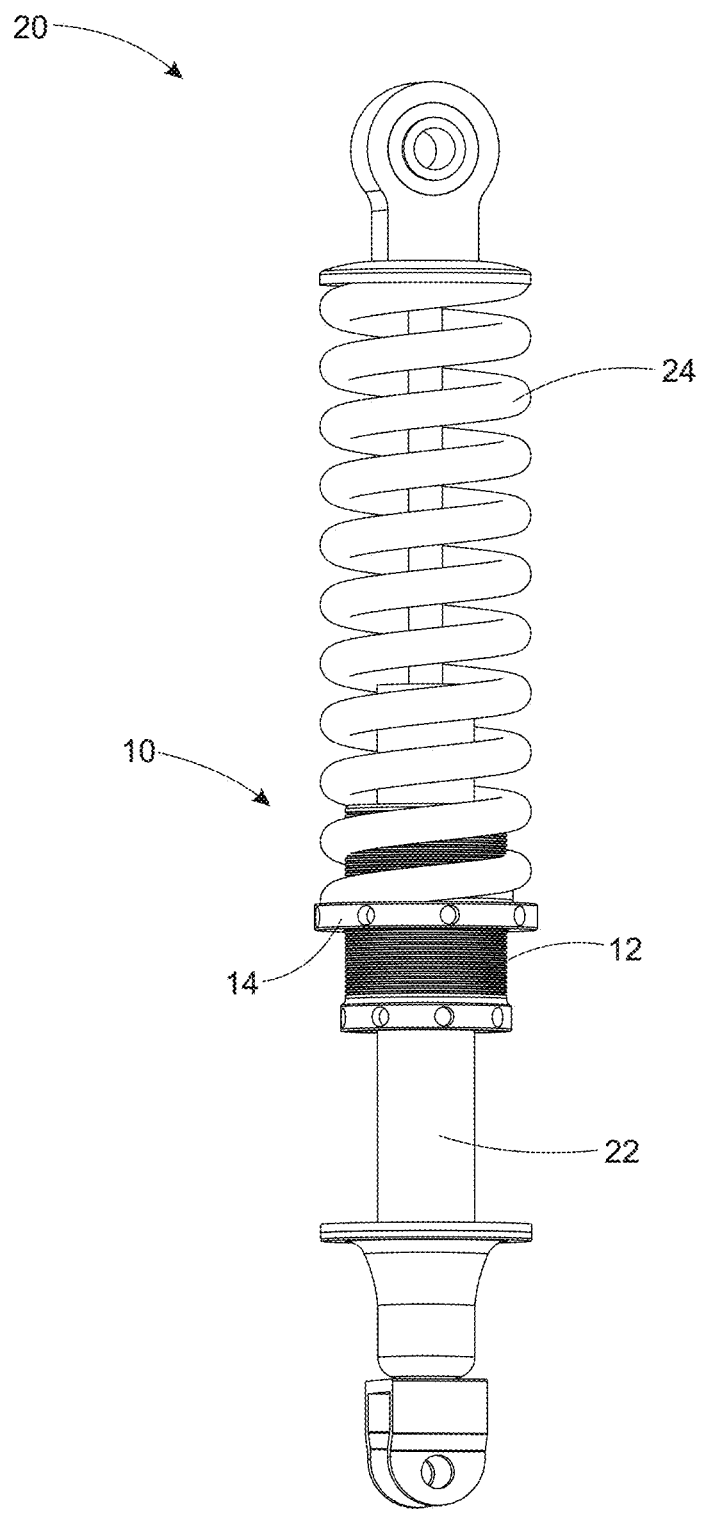
FIG. 4 is a front view of a shaft and a spring of a non-adjustable shock with an adjustable shock adapter installed thereto in accordance with an embodiment of the present technology.

Referring to FIGS. 1-4, in various embodiments, an adjustable shock adapter 10 attachable to a non-adjustable shock 20 on a UTV may comprise a tubular component 12 that can slide onto a shaft 22 of the non-adjustable shock 20.

The adjustable shock adapter 10 may also comprise a collar 14 that may be fitted either upwards or downwards on the tubular component 12 and is pressed against the spring 24 of the non-adjustable shock absorber 20 when the adjustable shock adapter 10 is installed. When the adjustable shock adapter 10 is fitted to the shock absorber 20, the user can adjust the height of the UTV by moving the collar 14 up or down, which compresses or releases the spring 24 of the shock absorber 20, respectively. This adjustment allows the user to ensure that the UTV is at the correct height for safe operation, regardless of the terrain it is being used on, while limiting the minimum height adjustment to ensure safe operation of the UTV.

The tubular component 12 may comprise a cylindrical structure configured to slide onto the shaft 22 of the non-adjustable shock absorber 20. The tubular component 12 may comprise an inner surface 16 defining an aperture 18 therethrough that allows for the mounting of the tubular component 12 to the shaft 22 of the non-adjustable shock absorber 20. An inner diameter of the aperture 18 may fit snugly around the shaft 22, and an outer diameter of the tubular component 12 may fit within a body of the non-adjustable shock absorber 20, such that the tubular component 12 does not impede or come into contact with any other components of the shock absorber 20 or the vehicle itself. By fitting seamlessly within the shock absorber 20, the tubular component 12 may operate efficiently without causing any unwanted friction or interference with other parts of the vehicle.

The outer surface 19 of the tubular component 12 may be circular and comprises threads formed around its outer edge. The threads may allow the collar 14 to be screwed onto the tubular component 12, which provides the user with a means of adjusting the spring and ride height of the shock absorber 20. The threads may be configured to be compatible or mateably engageable with corresponding threads formed on an inner surface of the collar 14, allowing the collar 14 to be moved up or down the tubular component 12, depending on the desired adjustment. Moving the collar 14 up may compress the spring 24 of the shock absorber 20, whereas moving the collar down may release the spring of the shock absorber.

The tubular component 12 may further comprise a first rim 13 that extends radially outward from the outer surface of the tubular component. The first rim 13 may be located towards the bottom of the tubular component 12 and abuts against a fixed component of the shock absorber 20, effectively creating a barrier that prevents the tubular component 12 from sliding past the component to ensure that the height adjustment of the UTV is maintained, even when subjected to the forces of the spring. Accordingly, the first rim 13 may prevent the UTV from being adjusted to a height that is too low, ensuring safe operation of the vehicle.

The tubular component 12 may be constructed from a variety of suitable materials depending on the specific application and performance requirements. Examples of such materials may include but are not limited to metals such as steel or aluminum, thermoplastics, and elastomers such as rubber, silicone, and polyurethane. The selection of material may depend on factors such as durability, stiffness, weight, and cost. Rubber, for instance, may be a suitable material choice for its ability to absorb shock and vibration, its resistance to wear and tear, and its relatively low cost. However, other materials may be preferred for their specific properties, such as aluminum for its lightweight and high strength or thermoplastics for their ability to withstand high temperatures and resist chemicals.

The collar 14 may be mounted to the outer surface 19 of the tube-shaped component 12, comprising threads formed on an inner surface thereof that are mateably engageable with the threads formed on the tube-shaped body, such that the collar 14 can be moved upwards or downwards along the tubular component 12 and locked into place by twisting the collar to either move it upwards or downwards. The collar 14 may comprise a second rim 15 extending radially outward from the collar, positioned against a spring 24 of the non-adjustable shock 20 when the invention is fitted to the non-adjustable shock 20, acting as a stopper to limit how low the height of the UTV can be adjusted.

The collar 14, which is pressed against the spring 24 of the shock absorber 20 to adjust the height of the UTV, may be constructed from a variety of suitable materials that are capable of withstanding the forces from the spring 24. These materials may comprise metals such as steel, aluminum, or titanium, which are known for their strength and durability. Other suitable materials may comprise high-strength plastics, composites, or alloys that are able to withstand the forces exerted by the spring. The selection of material may depend on various factors such as the specific application, operating conditions, and manufacturing requirements. Ultimately, the collar material should be able to withstand the stresses and strains that are encountered during use, while maintaining the desired level of performance and reliability.

The embodiments and examples set forth herein were presented in order to best explain the present technology and its practical application and to thereby enable those of ordinary skill in the art to make and use the technology. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the invention.

The invention claimed is:

1. An adjustable shock adapter attachable to a non-adjustable shock absorber on a UTV or other vehicle, comprising:

a tubular component configured to slide onto a shaft of the non-adjustable shock absorber, the tubular component having an inner surface defining an aperture allowing mounting of the tubular component to the shaft of the non-adjustable shock absorber;

a collar mountable on the tubular component, the collar being movable upwards or downwards along the tubular component and having threads formed on an inner surface thereof, the threads being mateably engageable with threads formed on an outer surface of the tubular component; and a first rim extending radially outward from the outer surface of the tubular component, located on a bottom end of the tubular component and abutting against a fixed component of the non-adjustable shock absorber to prevent the tubular component from sliding past the fixed component of the non-adjustable shock absorber;

wherein, when the adjustable shock adapter is fitted to the non-adjustable shock absorber, the collar pressed against a spring of the non-adjustable shock absorber enables adjustment of the height of the UTV by moving the collar up or down, compressing or releasing the spring, respectively; wherein the collar comprises a second rim extending radially outward from the collar and positionable along the tubular component.

2. The adjustable shock adapter of claim 1, wherein the tubular component is constructed from a material selected from the group consisting of steel, aluminum, thermoplastics, rubber, silicone, and polyurethane.

3. The adjustable shock adapter of claim 1, wherein the collar is constructed from a material selected from the group consisting of steel, aluminum, titanium, high-strength plastics, composites, and alloys.

4. The adjustable shock adapter of claim 1, wherein the threads formed on the outer surface of the tubular component and the threads formed on the inner surface of the collar are configured as mating threads allowing the collar to be securely moved up or down the tubular component for height adjustment of the UTV.

5. The adjustable shock adapter of claim 1, wherein the first rim acts as a barrier preventing the tubular component from sliding past the fixed component of the non-adjustable shock absorber, thereby maintaining the height adjustment of the UTV.

6. The adjustable shock adapter of claim 1, wherein the tubular component fits within a body of the non-adjustable shock absorber.

7. A method for adjusting the height of a UTV equipped with a non-adjustable shock absorber, the method comprising:
   providing an adjustable shock adapter comprising a tubular component and a collar;
   providing a first rim extending radially outward from an outer surface of the tubular component, wherein the first rim is located on a bottom end of the tubular component and abutting against a fixed component of the non-adjustable shock absorber to prevent the tubular component from sliding past the fixed component of the non-adjustable shock absorber;
   sliding the tubular component of the adjustable shock adapter onto a shaft of the non-adjustable shock absorber;
   fitting the collar onto the tubular component either upwards or downwards, wherein
   the collar comprises a second rim extending radially outward from the collar and positionable along the tubular component;
   pressing the second rim of the collar against a spring of the non-adjustable shock absorber to secure the adjustable shock adapter in place; and
   adjusting the height of the UTV by moving the collar up or down, thereby compressing or releasing the spring of the non-adjustable shock absorber, respectively.

8. The method of claim 7, wherein the step of providing an adjustable shock adapter further comprises constructing the tubular component from a material selected from the group consisting of steel, aluminum, thermoplastics, rubber, silicone, and polyurethane.

9. The method of claim 7, wherein the step of providing an adjustable shock adapter further comprises constructing the collar from a material selected from the group consisting of steel, aluminum, titanium, high-strength plastics, composites, and alloys.

10. The method of claim 7, wherein the step of sliding the tubular component onto the shaft of the non-adjustable shock absorber comprises fitting the tubular component within a body of the non-adjustable shock absorber.

11. The method of claim 7, wherein the step of fitting the collar onto the tubular component comprises engaging mating threads formed on an outer surface of the tubular component and an inner surface of the collar to allow secure movement of the collar up or down the tubular component.

12. The method of claim 7, wherein the step of pressing the collar against the spring of the non-adjustable shock absorber comprises applying sufficient force to adjust the height of the UTV.

\* \* \* \* \*